United States Patent [19]

Kobayashi et al.

[11] Patent Number: 5,598,485
[45] Date of Patent: Jan. 28, 1997

[54] APPARATUS FOR PERFORMING A JOINT FOURIER TRANFORM UTILIZING APERTURES OF LOW CORRELATION

[75] Inventors: Yuji Kobayashi; Haruyoshi Toyoda, both of Hamamatsu; Terushige Hori, Osaka, all of Japan

[73] Assignee: Hamamatsu Photonics K.K., Tokyo, Japan

[21] Appl. No.: 161,343

[22] Filed: Dec. 6, 1993

[30] Foreign Application Priority Data

Dec. 4, 1992 [JP] Japan ................................. 4-325513

[51] Int. Cl.$^6$ ............................................. G06K 9/64
[52] U.S. Cl. ...................... 382/278; 382/280; 382/124; 359/561
[58] Field of Search ................................. 382/42, 43, 31, 382/4, 278, 124, 210, 212, 280; 364/822; 359/561, 559, 560

[56] References Cited

U.S. PATENT DOCUMENTS

| | | | |
|---|---|---|---|
| 4,695,973 | 9/1987 | Yu | 364/822 |
| 4,832,447 | 5/1989 | Javidi | 350/162.13 |
| 5,119,443 | 6/1992 | Javidi et al. | 382/42 |
| 5,224,173 | 6/1993 | Kuhns et al. | 382/4 |
| 5,309,523 | 5/1994 | Iwaki et al. | 364/822 |

FOREIGN PATENT DOCUMENTS

| | | |
|---|---|---|
| 57-138616 | 8/1982 | Japan. |
| 57-212415 | 12/1982 | Japan. |
| 3-204625 | 9/1991 | Japan. |
| 4-115241 | 4/1992 | Japan. |

OTHER PUBLICATIONS

Casasent et al. "Image quality effects in optical correlators." Proc. of SPIE, vol. 310, Aug. 1981, pp. 183–192.

"Pattern Recognition with the Use of a Phase Filter in an Optical Correlation System", (Applied Physics, 58, 6 (1989).

"Fourier Transform in Optical Computing," T. Yatagai, Optics, 21, 6, pp. 392–399.

"Bistable spatial light modulator using a ferroelectric liquid crystal," Optics Letters, Mar. 1, 1990, vol. 15, No. 5, pp. 285–287.

Optronics No. 4, 1985, pp. 73–79.

"Experiments on nonlinear joint transform correlator using an optically addressed spatial light modulator in the Fourier plane," Javidi et al., Applied Optics, vol. 30, No. 14, pp. 1772–1776 (1991).

"Nonlinear joint power spectrum based optical correlation," B. Javidi, Applied Optics, vol. 28, No. 12 (Jun. 15, 1989).

"Optical fingerprint identification by binary joint transform correlation," K. Fielding et al., Optical Engineering, vol. 30, No. 12 (Dec. 1991).

*Primary Examiner*—Joseph Mancuso
*Assistant Examiner*—Jon Chang
*Attorney, Agent, or Firm*—Sughrue, Mion, Zinn, Macpeak & Seas

[57] ABSTRACT

A spatial Fourier transforming apparatus jointly Fourier transforms a plurality of input images to obtain a Joint Fourier transform image of the plurality of input images. The apparatus comprises: input means for inputting a plurality of input images; a mask member having a plurality of aperture edges for defining a plurality of apertures each for transmitting a part of a corresponding one of the plurality of input images, the plurality of aperture edges having low correlation; and Fourier transforming means for jointly Fourier transforming the parts of the plurality of input images having passed through the plurality of apertures and for obtaining a Joint Fourier Transform image of the plurality of input images.

11 Claims, 5 Drawing Sheets

T  B  R

← JOINT POWER SPECTRUM

CORRELATION PEAKS

ZERO ORDER DIFFRACTION PEAK

APPARATUS FOR PERFORMING A JOINT FOURIER TRANFORM UTILIZING APERTURES OF LOW CORRELATION

BACKGROUND OF THE INVENTION

1. Field of the Invention

The present invention relates to an optical information processing technique using spatial Fourier transform operation, and more particularly to an optical pattern recognition technique using joint transform correlation.

2. Description of the Related Art

Optical information processings have been developed which use spatial Fourier transform operation. Typically, image correlation methods have been proposed for optical image recognition systems. Various types of optical correlators have been proposed for detecting correlation between multiple images.

For example, a Vander-Lugt optical correlator has been proposed in "Pattern Recognition with the Use of a Phase Filter in an Optical Correlation System" (Applied Physics, 58, 6 (1989).) The Vander-Lugt optical correlator, however, requires precise positioning of a hologram image, and therefore is not practically applicable.

A Joint Transform Correlator (which will be referred to as "JTC," hereinafter) has been proposed in "Fourier Transform in Optical Information Processings" (Optics, 21, 6, pp. 392–399). The Joint Transform Correlator does not necessitate the precise positioning of the hologram image, and is practically applicable. For example, Japanese Unexamined Patent Application Publication No.3-204625 has proposed one type of the JTC.

SUMMARY OF THE INVENTION

Optical pattern recognition based on image correlation methods can be used for identifying an individual under investigation with a specific individual on record. Because individuals have fingerprints where ridge lines are distributed in their own characteristic manners, detecting whether or not an image produced from the fingerprint of the arbitrary person correlates with that of the specific person can identify the arbitrary person as the specific person. An individual identification apparatus therefore detects correlation of distribution manners how the ridge lines are distributed within the fingerprints. The individual identification apparatus of this type is therefore called a fingerprint identification apparatus.

An object of the present invention is to provide an improved spatial Fourier transform apparatus such as a Joint Transform Correlator especially suited for a fingerprint identification apparatus.

To achieve the above-described object, the present invention provides a spatial Fourier transforming apparatus for jointly Fourier transforming a plurality of input images to obtain a Joint Fourier transform image of the plurality of input images, the apparatus comprising: a light source for radiating light having a plurality of first parts bearing a plurality of input images and a second part bearing a background image; a mask member for receiving the light from the light source, the mask member having a mask area for blocking the second part of the light to thereby transmit at least a portion of each of the plurality of first parts of the light; and Fourier transforming means for receiving the at least portions of the plurality of first parts of light having passed through the mask member and for jointly Fourier transforming at least portions of the plurality of input images born on the at least portions of the plurality of first parts of the light to thereby obtain a Joint Fourier Transform image of the plurality of input images.

The mask area of the mask member may preferably have a plurality of aperture edges for defining a plurality of apertures each for transmitting the at least a portion of a corresponding one of the plurality of first parts of the light, the plurality of aperture edges having low correlation with one another. The plurality of aperture edges may have different orientation with one another. Each of the plurality of aperture edges may include at least one line, the at least one line of each of the plurality of aperture edges extending in a direction different from each other if laid one on the other without shifting its orientation. The mask area may have light transmittance of a zero value for blocking the light from the light source, each of the plurality of apertures may have light transmittance of sufficiently a high value to transmit the light, and each of the plurality of aperture edges may have light transmittance lowering gradually toward the zero value to reach the mask area.

According to another aspect, the present invention provides a spatial Fourier transforming apparatus for jointly Fourier transforming a plurality of input images to obtain a Joint Fourier transform image of the plurality of input images, the apparatus comprising: input means for inputting a plurality of input images; a mask member having a plurality of aperture edges for defining a plurality of apertures each for transmitting a part of a corresponding one of the plurality of input images, the plurality of aperture edges having low correlation; and Fourier transforming means for jointly Fourier transforming the parts of the plurality of input images having passed through the plurality of apertures and for obtaining a Joint Fourier Transform image of the plurality of input images.

According to a further aspect, the present invention provides a fingerprint identification apparatus for measuring correlation of an image of a fingerprint of a specific individual and an image of a fingerprint of an arbitrary individual to thereby determine whether or not the arbitrary individual is identified with the specific individual, the fingerprint identification apparatus comprising: a light source for radiating light having a first part bearing an image of a fingerprint of a specific individual, a second part bearing an image of a fingerprint of an arbitrary individual to be identified with the specific individual, and a third part bearing a background image; a mask member for receiving the light from the light source and for blocking the third part of the light while transmitting the first and second parts of the light; a first optically-addressable spatial light modulator including an optically-addressing part for receiving the first and second parts of the light and an modulation part having an optical characteristic, the optically-addressing part changing the optical characteristic of the modulation part dependently on the images of the fingerprints of the specific individual and the arbitrary individual, the modulation part receiving and modulating first read-light in accordance with the changed optical characteristic; a first Fourier transform lens for receiving the first read-light modulated by and outputted from the first spatial light modulator and spatially Fourier transforming the first read-light to thereby allow the first read-light to form a Joint Fourier Transform image for the image of the fingerprint of the specific individual and the image of the fingerprint of the arbitrary individual; a second optically-addressable spatial light modulator including an optically-addressing part for receiving the first read-light bearing the Joint Fourier Transform image and a modulation part having an optical characteristic, the optically-addressing part changing the optical characteristic of the modulation part dependently on the Joint Fourier Transform image, the modulation part receiving and modulating second read-light in accordance with the changed optical characteristic; a second Fourier transform lens for receiving the second read-light modulated by and outputted from the second spatial light modulator and spatially Fourier transforming the second read-light to thereby allow the second read-light to form a pair of correlation peaks; and correlation detecting means for detecting intensity of one of the pair of correlation peaks indicative of the correlation of the image of the fingerprint of the specific individual and the image of the fingerprint of the arbitrary individual which determines whether or not the arbitrary individual is identified as the specific individual. The mask member may have a mask area for blocking the third part of the light, the mask area having a pair of aperture edges for defining a pair of apertures each for transmitting at least a portion of a corresponding one of the first and second parts of the light, the pair of aperture edges having low correlation with one another.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
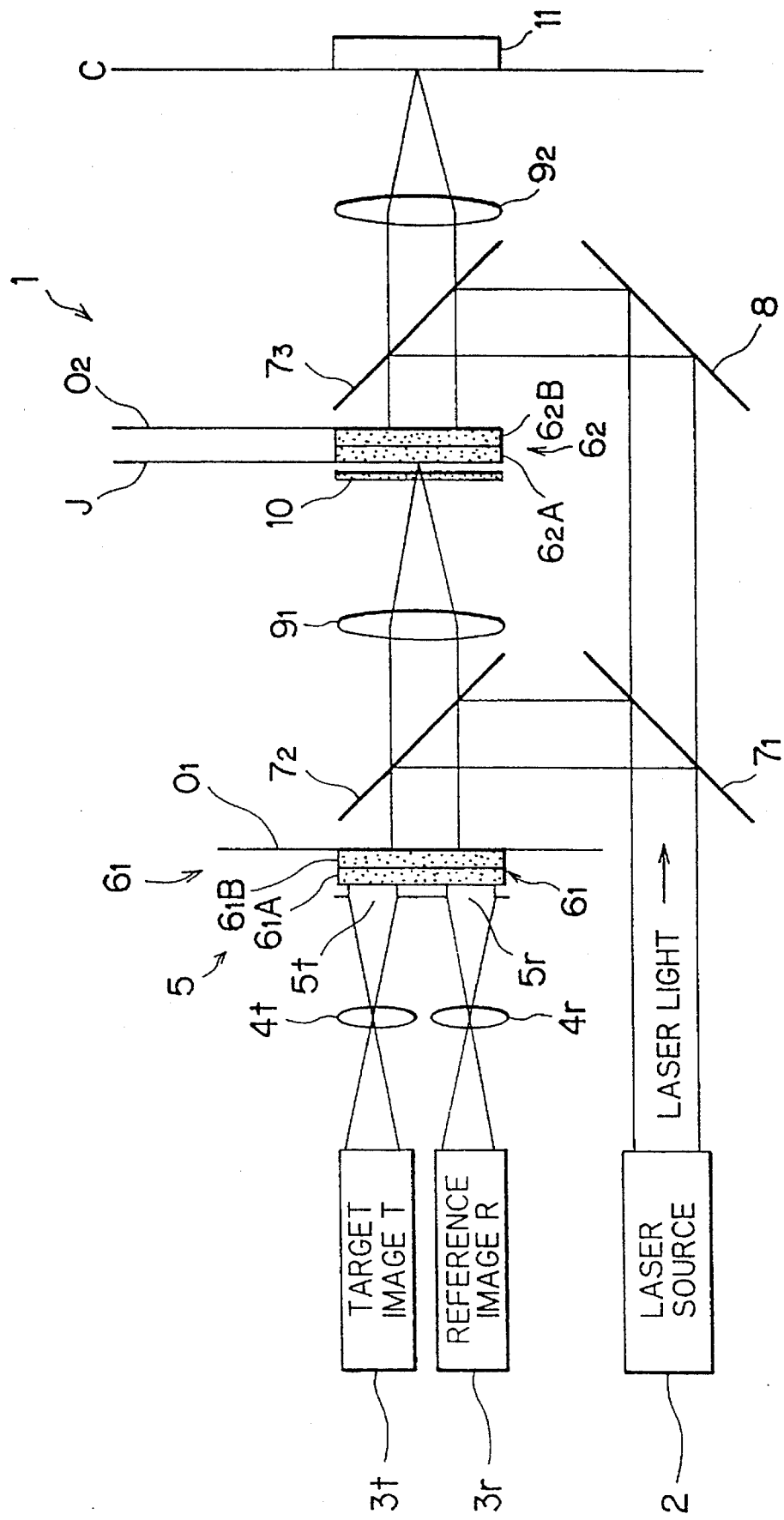
FIG. 1 shows an optical system of a Joint Transform Correlator of an embodiment of the present invention.

Referring to the accompanying drawings, a preferred embodiment of the invention will be described wherein like parts and components are designated by the same reference numerals to avoid duplicating description.

The preferred embodiment embodies the spatial Fourier transform apparatus of the present invention into a Joint Transform Correlator.

A structure of the Joint Transform Correlator of the preferred embodiment is schematically shown in FIG. 1. The JTC 1 serves for measuring correlation of a target image T and a reference image R through a Joint Transform Correlation process. According to the present invention, the JTC 1 utilizes reflection-type optically-addressable spatial light modulators (SLMs) of high resolution.

Figure 2:
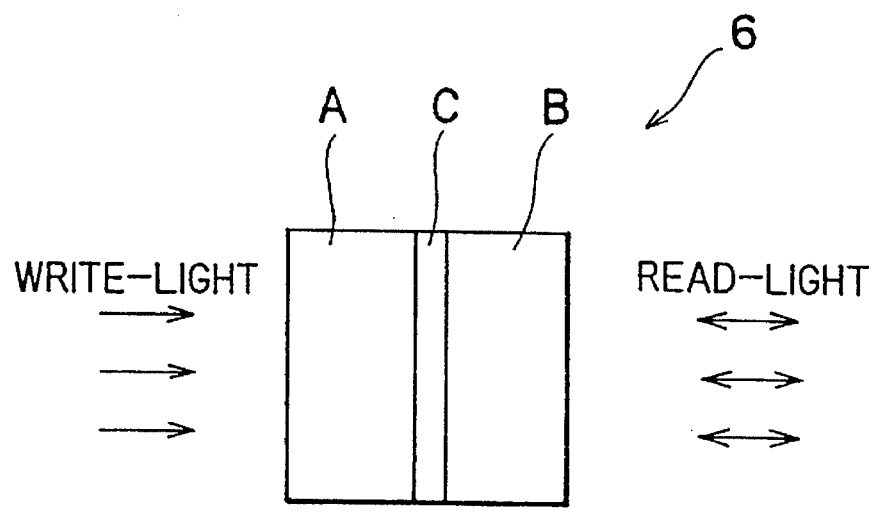
FIG. 2 schematically shows a basic structure of an optically-addressable SLM employed in the Joint Transform Correlator of FIG. 1.

As shown in FIG. 2, a reflection-type optically-addressable SLM 6 mainly includes: an optically-addressing part A; a modulating part B; and an isolating layer C provided between the parts A and B. The optically-addressing part A receives coherent or incoherent write-light bearing a two-dimensional intensity distribution (i.e., an optical image). The optically-addressing part A changes optical characteristic of the modulation part B in accordance with the received optical image. The modulation part B receives and modulates coherent read-light in accordance with the altered optical characteristic. The optically-addressable SLM therefore modulates coherent read-light in accordance with the received optical image borne on the write-light. The isolating layer C is provided for isolating the write-light and the read-light. The read-light projected into the modulating part B travels in the modulating part as modulated therein to reach the isolating layer C. The read-light then reflects off the isolating layer C and travels again in the modulating part B where the read-light is again modulated. The modulated read-light outputs from the modulation part B.

In the JTC 1 of the present invention, as shown in FIG. 1, a pair of image light sources $3t$ and $3r$ are located side by side for emitting write-light bearing a target image T and a reference image R, respectively. A pair of lenses $4t$ and $4r$ are provided for respectively focusing the write-light from the light sources $3r$ and $3t$ onto an optically-addressing part $6_1A$ of a first optically-addressed SLM $6_1$. The lenses $4t$ and $4r$ are positioned so as to respectively receive and focus the write-light from the light sources $3r$ and $3t$ onto the optically-addressing part $6_1A$.

Figure 3:
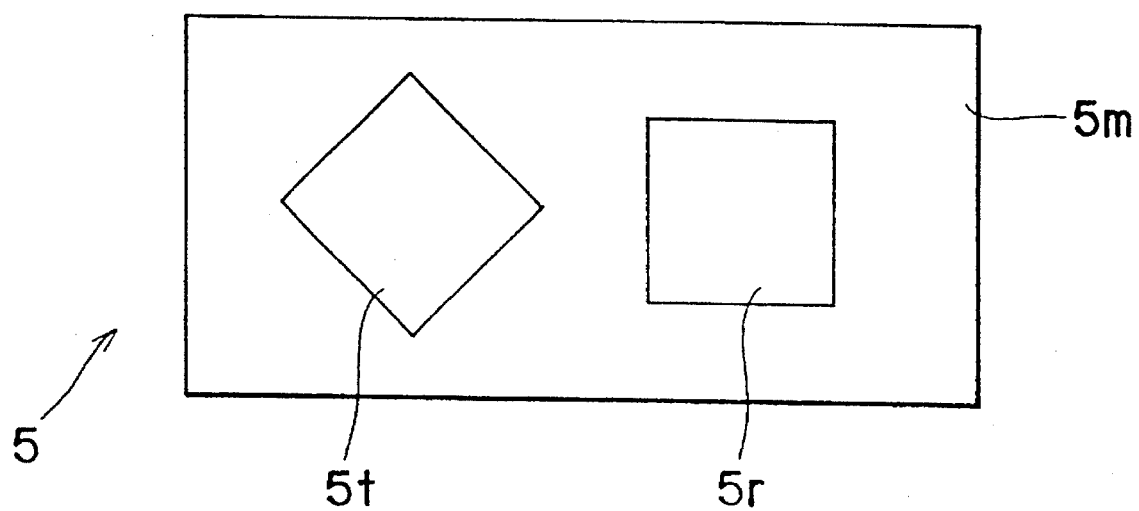
FIG. 3 schematically shows a mask member employed in the Joint Transform Correlator of FIG. 1 and formed with a pair of apertures.

According to the present invention, a mask member 5 is provided between the lenses $4t$ and $4r$ and the optically-addressing part $6_1A$ of the first SLM $6_1$. As shown in FIG. 3, the mask member 5 is formed with a pair of apertures $5t$ and $5r$. The shape and position of the aperture $5t$ allow only a desired part of the write-light from the lens $4t$ to be incident on the optically-addressing part $6_1A$. The shape and position of the aperture $5r$ allow only a desired part of the write-light from the lens $4r$ to be incident on the optically-addressing part $6_1A$. The optically-addressing part $6_1A$ therefore receives only the target image T and the reference image R. As a result, the optical characteristic of the modulation part B alters in accordance with the images T and R.

A laser source 2 is provided for emitting coherent laser beam. A part of the laser beam splitted off at a half mirror $7_1$ then reflects at a half mirror $7_2$. The laser beam from the half mirror $7_2$ is introduced, as read-light, to the modulation part $6_1B$ of the SLM $6_1$. The laser beam is modulated in the modulation part $6_1B$ according to the images R and T. In other words, the images R and T written in the SLM $6_1$ by the write-light is reproduced by the read-light. The read-light thus bearing thereon the images R and T outputs from the SLM and passes through the half mirror $7_2$. The read-light is then Fourier transformed by a Fourier transform lens $9_1$.

Since the modulation part $6_1$B of the SLM $6_1$ is located on the object plane $O_1$ of the lens $9_1$, a Joint Fourier Transform intensity distribution (or a Joint Fourier Transform image) is produced on the Fourier plane of the lens $9_1$, that is, on the Joint Fourier Transform plane J. The Joint Fourier Transform image is called Joint Power Spectrum. Immediately before the Joint Fourier Transform plane J, there is provided a filter 10 for cutting off a zero order diffraction peak of the Joint Fourier Transform image.

An optically-addressing part $6_2$A of a second optically-addressable SLM $6_2$ is positioned on the plane J. Accordingly, the Joint Fourier Transform image from which the zero order peak is omitted is incident on the optically-addressing part $6_2$A as write-light. The optical characteristic of the modulation part $6_2$B of the SLM $6_2$ varies in accordance with the Joint Fourier Transform image.

Remaining part of laser beam (read-light) that passes the half mirror $7_1$ is reflected by a mirror 8. The laser beam is then partly reflected at another half mirror $7_3$ to be introduced, as read-light, into the modulation part $6_2$B of the SLM $6_2$. The laser beam is modulated in the modulation part $6_2$B according to the joint Power Spectrum. In other words, the Joint Power Spectrum written in the SLM $6_2$ by the write-light is reproduced by the read-light. The read-light thus bearing thereon the Joint Power Spectrum outputs from the SLM $6_2$ and passes through the half mirror $7_3$. The read-light is then Fourier transformed by another Fourier transform lens $9_2$. Since the modulation part $6_2$B of the SLM $6_2$ is located on the object plane $O_2$ of the lens $9_2$, an output correlation intensity distribution (or an output correlation image) is produced on the Fourier plane of the Fourier Transform lens $9_2$ (which will be referred to as an "output correlation plane C," hereinafter.)

The output correlation intensity distribution includes a zero order diffraction peak and a pair of first ((+1)-th and (−1)-th) order diffraction peaks. The pair of first order diffraction peaks are located symmetrically on the opposite sides of the zero order diffraction peak. A distance between the (+1)-th order diffraction peak and the zero order diffraction peak and a distance between the (−1)th order diffraction peak and the zero order diffraction peak are equal to each other and correspond to a distance between the target image T and the reference image R incident on the SLM $6_1$. Intensity of the zero order diffraction peak corresponds to intensities of the target image T and the reference image R. Both first order diffraction peaks have equal intensities. Their intensities correspond to the magnitude to which the images T and R correlate. Accordingly, the first order diffraction peaks are called correlation peaks.

An intensity detector 11 such as a photodiode is located on the output correlation plane C at such a position as is capable of detecting intensity of one of the first order diffraction peaks. The intensity detector 11 therefore outputs an electrical correlation signal representative of the intensity of the first order diffraction peak, i.e., the magnitude to which the images T and R correlate.

As described above, in the JTC 1 of the present invention, the optically-addressable SLM $6_1$ modulates coherent beam in accordance with the images R and T. The Fourier Transform lens $9_1$ produces the Joint Power Spectrum for the images R and T. The optically-addressable SLM $6_2$ modulates coherent beam in accordance with the joint Power Spectrum. The Fourier Transform lens $9_2$ produces the output correlation peaks. It is noted that the optically-addressable SLM can directly receive an optical image born on write-light and accordingly modulate read-light. Therefore, the JTC 1 employed with the SLMs $6_1$ and $6_2$ has a simple structure. In addition, the JTC 1 can perform its Joint Transform Correlation process in a short period of time, resulting in a high speed measurement.

Figure 4:
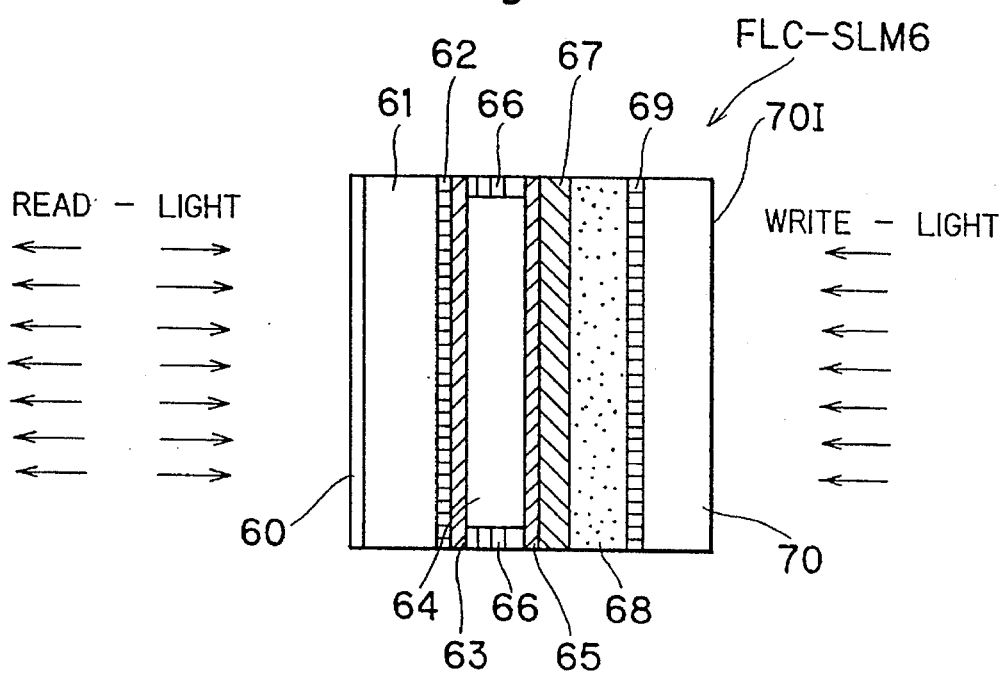
FIG. 4 is a sectional view of schematically showing an FLC-SLM employed in the Joint Transform Correlator of FIG. 1.

For each of the SLMs $6_1$ and $6_2$, a ferroelectric liquid crystal spatial light modulator (FLC-SLM) may preferably be used. The FLC-SLM will be described below with reference to FIG. 4.

An FLC-SLM 6 has a sandwich structure in which a ferroelectric liquid crystal layer (which will be referred to as a "liquid crystal layer", hereinafter) 64 is sandwiched between a pair of alignment layers 63 and 65. A thickness of the liquid crystal layer 64 is determined by epoxy walls 66. A dielectric mirror 67, an amorphous silicon layer (which will be referred to as an "a-Si layer", hereinafter) 68, a transparent electrode layer 69 and a glass layer 70 are provided on the alignment layer 65, in this order. The glass layer 70 defines a write-light incident surface 70I. Another transparent electrode layer 62, a glass layer 61, and an antireflection coating layer 60 are provided on the other alignment layer 63, in this order. The a-Si layer 68 is a photoconductor layer serving as an optical intensity-voltage converter. A driving voltage is applied between the electrode layers 62 and 69. The liquid crystal layer 64 is formed of chiral smectic C liquid crystal, and serves to change its liquid crystal molecule arrangement (i.e., its optical characteristics) in accordance with intensity distribution (optical image) incident on the a-Si layer 68. That is, the a-Si layer 68 serves as the optically-addressing part A, the liquid crystal layer 64 serves as the modulating part B, and the dielectric mirror layer 67 serves as the isolating layer C. Details of the FLC-SLM are described in a document "Bistable spatial light modulator using a ferroelectric liquid crystal" (pp.285–287 of "OPTICS LETTERS" published on Mar. 1, 1990).

Since the FLC-SLM has the above structure, when the FLC-SLM is used for the SLM $6_1$, the mask member 5 is provided over an entire area of the write-light incident surface 70I of the glass plate 70. Similarly, when the FLC-SLM is used for the SLM $6_2$, the filter 10 is provided over an entire area of the write-light incident surface 70I of the glass plate 70.

It is noted that other various kinds of optically-addressable SLMs can be used for each of the SLMs $6_1$ and $6_2$. For example, PROMs, LCLVs, Si-LCLVs, VGM-LCLVs, MSLMs, Photo-Titus, Photorefractive SLMs, etc. can be used, details of which are described in "Optronics No.4" (1985). In addition, a homogeneous arrangement type nematic liquid crystal spatial light modulator can also be used. This type of SLM has, as the modulating part B, a nematic liquid crystal layer where liquid crystal molecules of nematic phase are arranged to extend parallel with the surfaces of the glass layers 61 and 70 with no spiral structures.

The above-described JTC 1 can be applied to an individual identification apparatus for identifying an individual under investigation with a specific individual on record. (The person under investigation will be referred to as an "arbitrary individual", hereinafter )

Figure 5:
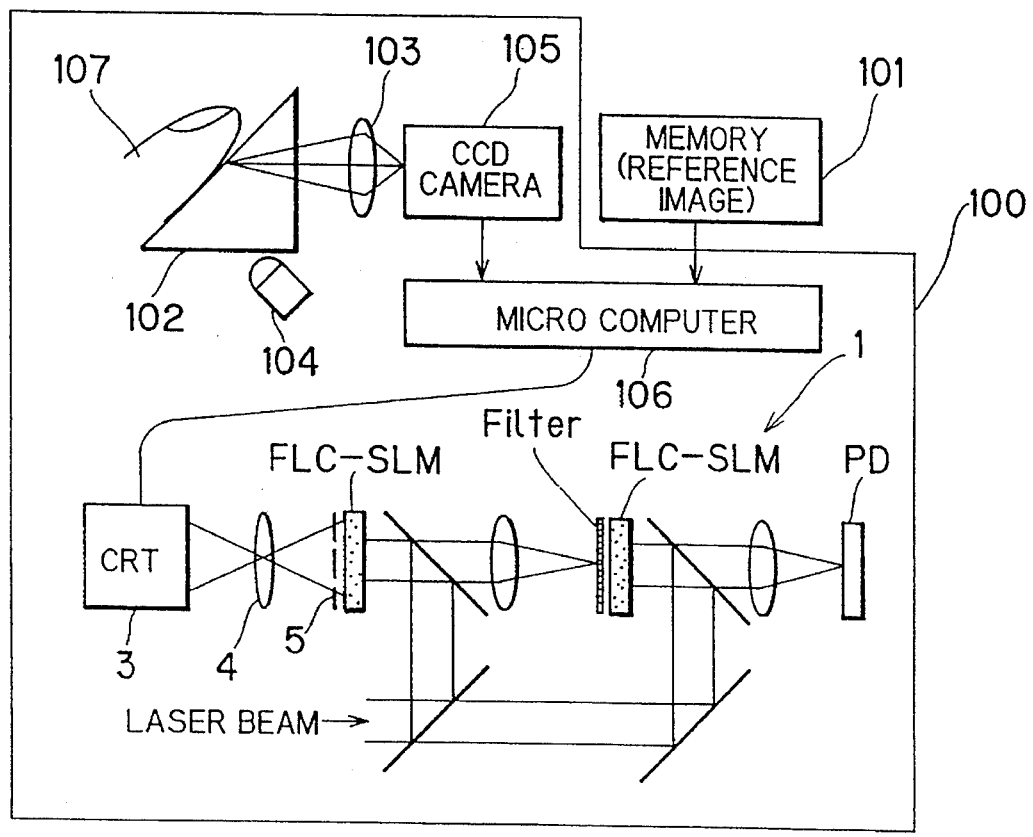
FIG. 5 schematically shows a fingerprint identification apparatus to which applied is the Joint Transform Correlator of FIG. 1.

FIG. 5 shows one concrete example of an optical fingerprint identification apparatus to which applied is the above-described JTC 1 of the present invention. The fingerprint identification apparatus 100 is suited for secure entry systems to identify individuals for access to a restricted area or room, etc. The fingerprint identifying apparatus 100 operates in combination with an external storing device 101, such as an identification card, for storing information on a fingerprint of a specific person. (The fingerprint of the specific person corresponds to the reference image R.) The fingerprint identification apparatus 100 retrieves the fingerprint stored in the external storing device 101 and correlates it with a fingerprint of a finger 107 of an arbitrary person to be identified with the specific person. (The fingerprint of the arbitrary person therefore corresponds to the target image T.)

If a fingerprint identification apparatus stores therein information on the fingerprint of the specific individual, thus storing private informations will invade privacy of the specific individual. The above-described apparatus 100, however, is separately provided with a card 101 for storing information on the fingerprint of the specific person. Thus combining the apparatus 100 with the separately provided card 101 does not necessitate storing the specific person's fingerprint in the apparatus 100, per se, resulting in protection of the privacy.

In the fingerprint identifying apparatus 100, a control portion such as a microcomputer 106 retrieves the information on the specific person's fingerprint (reference image R) from the card 101. In order to obtain an arbitrary person's fingerprint, the apparatus 100 is provided with a standard 90-deg prism 102; a semiconductor laser (LD) 104; an imaging lens 103; and a charge-coupled device (CCD) image pickup camera 105.

The LD 104 is positioned for emitting laser beam in such a direction that the laser beam may enter one side of the prism 102 and strike the hypotenuse thereof at a predetermined incident angle larger than the critical angle of the prism. The laser beam is totally internally reflected at the internal surface of the hypotenuse. When the finger 107 is placed on the hypotenuse, however, the ridges of the fingerprint selectively contact with the external surface of the prism, resulting in a change of the boundary condition of the hypotenuse which suppresses the total internal reflection. Thus, laser beam reaching the hypotenuse at such a position as contacted with the ridges transmits further into the skin of the finger where the laser beam will be largely attenuated. Laser beam thus reflected or diffracted by the finger 107 at the hypotenuse therefore bears thereon an image of the fingerprint, i.e., the target image T. The lens 103 is provided for receiving the laser beam reflected from the hypotenuse and focusing it onto its focal plane. The arbitrary person's fingerprint, i.e., the target image T, is thus imaged on the focal plane of the lens 103. The CCD image pickup camera 105 located on the focal plane of the lens 103 picks up the target image T. The CCD camera converts the optical fingerprint image T into electrical signals, and supplies them into the control portion 106.

Thus receiving informations on both the reference image R and the target image T, the microcomputer 106 calculates to arrange the images R and T side by side. The microcomputer 106 is connected to the JTC 1 described above with reference to FIG. 1. In the JTC 1 applied in the individual identification apparatus, a single cathode-ray tube (CRT) 3 is used in place of the pair of write-light sources 3t and 3r. The CRT 3 is electrically connected to the microcomputer 106 for receiving electric signals representative of the images R and T and accordingly emitting write-light bearing those images. A single imaging lens 4 is provided for receiving and focusing the write-light. A mask member 5 has the apertures 5t and 5r at such positions for respectively receiving the target image T and the reference image R.

The reasons why the present invention provides the mask member 5 on the first SLM $6_1$ will be described below.

Figure 6A:
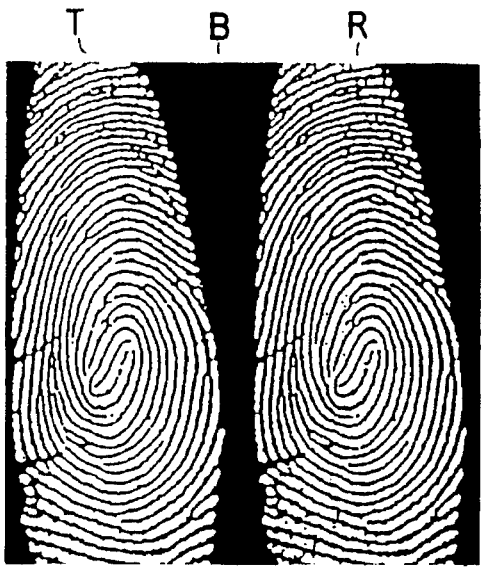
FIG. 6(a) shows the state how the images of the fingerprints of a specific person and an arbitrary person to be identified with the specific person are incident on the SLM $6_1$ of FIG. 5 in the case where the mask member is not provided.
Figure 6B:
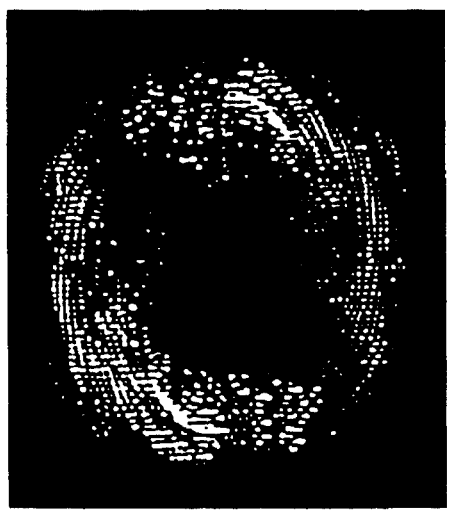
FIG. 6(b) shows the Joint Fourier Transform image obtained based on the images of fingerprints of FIG. 6(a)
Figure 6C:
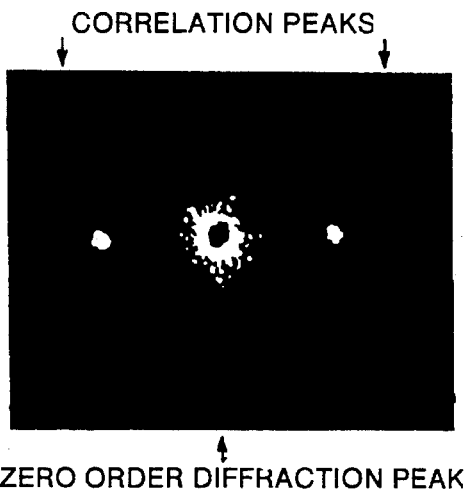
FIG. 6(c) shows the output correlation image obtained based on the Joint Fourier Transform image of FIG. 6(b)

As shown in FIG. 6(a), if the optically-addressed part $6_1A$ is not provided with the mask member 5, background light B is also incident on the optically-addressed part $6_1A$ at areas surrounding the images R and T. The background light intensity also affects the optical characteristic of the modulation part $6_1B$ so that the laser beam (read-light) incident on the modulation part is modulated not only in accordance with the images R and T but also in accordance with the background light intensity B. Accordingly, the background image B is also subjected to Fourier Transformation at the lens $9_1$. This deteriorates contrast of the Joint Fourier Transform image and accordingly lowers the intensity of correlation peaks. Even when the images T and R have high correlation, the correlation peaks can show low intensities which fail to correctly detect correlation of the images. FIG. 6(b) shows the Joint Fourier Transform image obtained from the images of FIG. 6(a) with the zero order diffraction peak removed using a filter 10. FIG. 6(c) shows the output correlation image including the zero order diffraction peak and the pair of correlation peaks obtained from the images of FIG. 6(a).

Figure 7:
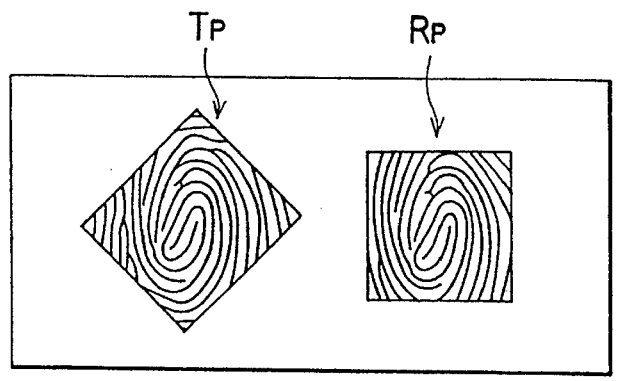
FIG. 7 shows the state how the images of the fingerprints of a specific person and an arbitrary person to be identified with the specific person are incident on the SLM $6_1$ of FIG. 5 in the case where the mask member is provided.

Contrarily, the present invention provides the mask member 5 with positions and areas of apertures 5t and 5r selected to completely prevent the background light B from being incident on the addressed part $6_1A$, thus allowing only the desired images T and R to be incident on the addressed part. The SLM $6_1$ modulates read-light in accordance with the images R and T only, thus enhancing the contrast of the Joint Fourier Transform image, to thereby highly precisely measure correlation of the images R and T. More specifically, as shown in FIG. 7, the mask member 5 allows the optically-addressed part $6_1A$ to receive the target image T shaped as per the aperture 5t and the reference image R shaped as per the aperture 5r. Thus, the optically-addressed part $6_1A$ receives a part of the target image T (which will be referred to as a "target image part $T_p$," hereinafter) and a part of the reference image R (which will be referred to as a "reference image part $R_p$," hereinafter). When the images T and R are fingerprints, as apparent from FIG. 7, the target image part $T_p$ and the reference image part $R_p$ indicate distributions of ridges in the corresponding parts of fingerprints of the arbitrary person and the reference person, but do not indicate outlines of the fingerprints. Individuals have fingerprints where ridge lines are distributed in their own characteristic manners. In order to identify individuals, therefore, it is necessary to detect correlation of distribution manners (i.e., distribution patterns) how the ridge lines are distributed within the fingerprints. It is unnecessary to detect correlation of outlines of the fingerprints. Because the target image part $T_p$ and the reference image part $R_p$ do not indicate outlines of fingerprints, but indicate distributions of ridges within the corresponding parts of the fingerprints, detecting correlation of those image parts $T_p$ and $R_p$ can identify the arbitrary person as the reference person.

Other than fingerprints, there are many images which have their own characteristic pattern distributions within them but have featureless outlines. In order to identify such images, it is sufficient to detect correlation of the pattern distributions within those images. Using the mask member 5 is therefore especially suited for recognizing such types of images.

AS apparent from FIG. 7, the target image part $T_p$ received on the optically-addressing part $6_1A$ is surrounded by an outline corresponding to the edge of the aperture 5t. The reference image part $R_p$ is surrounded by an outline corresponding to the edge of the aperture 5r. When the image parts $T_p$ and $R_p$ are subjected to the Fourier transformation by the lens $9_1$, the outlines are also subjected to the Fourier transformation. If those outlines have high correlation, they will contribute to production of a high correlation signal through the Joint Transform Correlation process. Under such circumstances, a high correlation signal can be obtained, which fails to accurately reflect the actual magnitude to which the images T and R correlate. It is therefore necessary that the edges of the apertures $5t$ and $5r$ should have low correlation.

Figure 8:
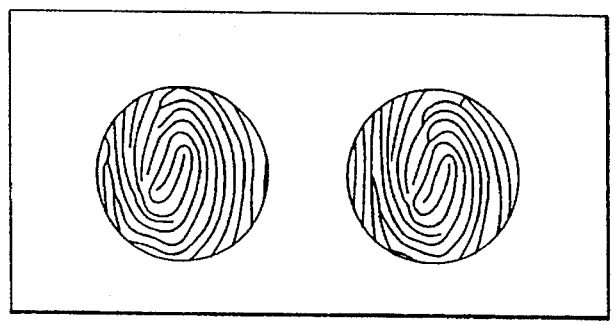
FIG. 8 shows examples of the apertures of the mask member that have high correlation.

As a first method of making the aperture edges have low correlation, the apertures $5t$ and $5r$ can be shaped or oriented differently on the mask member 5, so that if laid one on the other without shifting orientation, no lines of the FIG. $5t$ will extend in parallel with or overlap with any lines of the FIG. $5r$. In other words, no lines on the FIG. $5t$ should extend in the same orientation or direction with any lines of FIG. $5r$. This is because straight or curved lines extending in the same orientation are Fourier Transformed into similar patterns. Accordingly, when lines extending in the same direction but located side by side are jointly subjected to a Fourier transformation, they will contribute to a production of a high correlation signal. For example, if both of the apertures have circular forms as shown in FIG. 8, they will produce a high correlation signal even if the images R and T have a low correlation.

FIG. 3 shows one preferred example of the figures of those apertures $5t$ and $5r$ which are the same quadrangles but are slanted with different orientation. The figure of the aperture $5t$ has therefore no lines which will extend parallel or overlap with any lines of the FIG. $5r$ if FIG. $5t$ were superimposed on the FIG. $5r$. In other words, no lines of the FIG. $5t$ extend in the same orientation with any lines of the FIG. $5r$. As another preferred example, one of the apertures $5t$ and $5r$ may have a circular figure, and the other a triangular figure. Also in this case, no lines of the FIG. $5t$ extend in the same orientation with any lines of the FIG. $5r$. Other various examples can be selected.

As a second method of making the aperture edges have the low correlation, the apertures should be formed into soft apertures. The amplitude or light transmittance of the apertures at their edges should be adjusted to gradually, rather than sharply, lower to zero. Thus blurred edges will lower intensity of their Fourier transformed patterns. Accordingly, even if the apertures have the same figures and the same orientation, they will produce a low correlation signal through a Joint Transform Correlation process if they have the blurred edges. The blurred edges can therefore be said to have low correlation.

Figure 9:
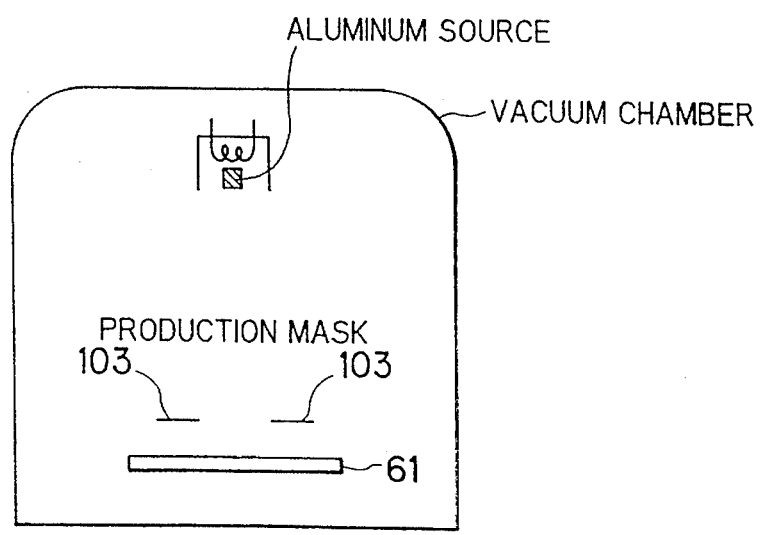
FIG. 9 shows the manner how the mask member is produced through vapor deposition method.

In order to produce the mask member 5 having the thus blurred edged apertures, for example, the glass layer 70 of the SLM $6_1$ may be coated with metal through a vapor deposition method. FIG. 9 shows one example of the manner of producing the mask member 5 by coating the glass layer 70 through a production mask 103 with aluminum using vacuum vapor deposition. The production mask 103 determines where on the glass layer 70 of the SLM $6_1$ the aluminum layer is formed for producing the mask member 5.

The above-described two methods of making the apertures $5t$ and $5r$ have a low correlation may be applied either separately or in combination.

To summarize, according to the present invention, as shown in FIG. 3, the mask member 5 has a mask area $5m$ with its light transmittance of a zero value for blocking light and the apertures $5t$ and $5r$ with their light transmittance of sufficiently a high value for transmitting light. The apertures $5t$ and $5r$ have their figures corresponding to the areas of the images T and R, respectively. Accordingly, when the images T and R pass through the apertures $5t$ and $5r$, the background image B is completely blocked by the mask area $5m$. Accordingly, contrast of the Joint Fourier Transform image obtained on the plane J is greatly enhanced. An output correlation peak obtained on the output correlation plane C has therefore no noise component produced based on the background image B.

In addition, according to the present invention, the aperture edges formed on the mask member for defining the apertures $5t$ and $5r$ have low correlation. Because outlines of the image parts $R_p$ and $T_p$ of the images R and T having passed through the apertures $5r$ and $5t$ correspond to the aperture edges, the outlines have also low correlation. Because not only the image parts $R_p$ and $T_p$ but also the outlines are subjected to the Joint Transform Correlation process, the intensity of the output correlation peak is formed from an intensity component representative of the correlation between the image parts $R_p$ and $T_p$ and another intensity component representative of the correlation between the outlines. Because the intensity component representative of the correlation between the outlines has a low amount, the output correlation peak intensity is mainly formed from the intensity component representative of the correlation between the image parts $R_p$ and $T_p$. That is, the output correlation peak intensity highly precisely represents the correlation between the images T and R.

In order to make the aperture edges have low correlation, the figures of the apertures $5r$ and $5t$ may be shaped or oriented differently. The apertures may be formed into soft apertures. The aperture edge for each of the apertures may have light transmittance gradually lowering toward a zero value to reach the mask area $5m$. In other words, the aperture edge may gradually decrease in light transmittance from the high value of the light transmittance of the aperture area toward the zero value of the mask area.

As apparent from the above, because the spatial Fourier transform apparatus of the present invention is provided with the mask member, the apparatus can obtain an output correlation signal accurately indicating the correlation of multiple input images. The spatial Fourier transform apparatus of the present invention is suited for jointly Fourier transforming multiple images, such as fingerprints, that have their distinct pattern distributions within them. When the spatial Fourier transform apparatus is applied to an image recognition device, the image recognition device can recognize images with high recognition rate.

While the invention has been described in detail with reference to a specific embodiment thereof, it would be apparent to those skilled in the art that various changes and modifications may be made therein without departing from the spirit of the invention.

For example, the above-described embodiment is directed to a Joint Transform Correlator, but the present invention is applicable to various types of spatial Fourier Transform apparatus for inputting multiple images and jointly Fourier transforming the multiple images.

In the above-described embodiment, the mask area $5m$ of the mask member 5 has light transmittance of the zero value for blocking the background light B. However, the mask area $5m$ may not have light transmittance of zero value. The mask area $5m$ may have light transmittance of a sufficiently low value so that intensity of light having passed through the mask area to be incident on the optically-addressing part $6_1A$ may not vary the optical characteristics of the modulation part $6_1B$ of the SLM $6_1$. In such a case, the apertures in soft aperture forms may have light transmittance gradually lowering from the high value of the aperture area toward the low value of the mask area.

What is claimed is:

1. A spatial Fourier transforming apparatus for jointly Fourier transforming a plurality of input images to obtain a Joint Fourier transform image of the plurality of input images, the apparatus comprising:

a light source for radiating light bearing a plurality of input images and a background image;

a mask member for receiving the light from said light source, said mask member having a mask area for blocking light bearing the background image to thereby transmit light bearing at least a portion of each of the plurality of input images; and Fourier transforming means for receiving the light bearing at least portions of the plurality of input images having passed through said mask member and for jointly Fourier transforming the at least portions of the plurality of input images to thereby obtain a Joint Fourier Transform image of the plurality of input images;

wherein the mask area of said mask member has a plurality of apertures each for transmitting light bearing the at least a portion of a corresponding one of the plurality of input images, the plurality of apertures having low correlation with one another; and wherein the mask area has light transmittance of a zero value for blocking the light from said light source, each of the plurality of apertures has high light transmittance, and the plurality of apertures each has light transmittance lowering gradually from the center of the aperture to the edge of the aperture.

2. The spatial Fourier transforming apparatus as claimed in claim 1, wherein the plurality of apertures have different orientations with respect to one another.

3. A spatial Fourier transforming apparatus for jointly Fourier transforming a plurality of input images to obtain a Joint Fourier transform image of the plurality of input images, the apparatus comprising:

input means for inputting a plurality of input images utilizing a light source;

a mask member having a mask area and a plurality of apertures each for transmitting a portion of a corresponding one of the plurality of input images, the plurality of apertures having low correlation with one another; and Fourier transforming means for jointly Fourier transforming the portions of the plurality of input images having passed through the plurality of apertures and for obtaining a Joint Fourier Transform image of the plurality of input images;

wherein the mask area has light transmittance of a zero value for blocking the light from said light source, each of the plurality of apertures has a sufficiently high light transmittance to transmit the light, and the plurality of apertures each has light transmittance lowering gradually from the center of the aperture to the edge of the aperture.

4. The spatial Fourier transforming apparatus as claimed in claim 3, wherein said light source is for radiating light bearing the plurality of input images and also bearing a background image, said mask area is for blocking light bearing the background image to thereby cause the plurality of apertures to transmit light bearing the portions of the plurality of input images.

5. The spatial Fourier transforming apparatus as claimed in claim 4, wherein the plurality of apertures have orientations different from one another.

6. The spatial Fourier transforming apparatus as claimed in claim 5, wherein each of the plurality of apertures includes at least one line being part of its edge, the at least one line of each of the plurality of apertures extending in a direction different from the at least one line of another aperture if the apertures are laid one on the other without shifting the orientation of the apertures.

7. The spatial Fourier transforming apparatus as claimed in claim 4, further comprising first optically-addressable spatial light modulator for receiving the light bearing the portions of the plurality of input images and for receiving and spatially modulating read-light in accordance with the portions of the plurality of input images, said Fourier transforming means includes a Fourier transform lens for receiving and Fourier transforming the read-light modulated and outputted from said first optically-addressable spatial light modulator.

8. The spatial Fourier transforming apparatus as claimed in claim 4, further comprising a second Fourier transforming means for Fourier transforming the Joint Fourier Transform image and for obtaining an output correlation image indicative of the correlation between the plurality of input images.

9. The spatial Fourier transforming apparatus as claimed in claim 8, further comprising an optically-addressable spatial light modulator for receiving the Joint Fourier Transform image and for receiving and spatially modulating read-light in accordance with the Joint Fourier Transform image, wherein said second Fourier transforming means includes a Fourier transform lens for receiving and Fourier transforming the read-light modulated and outputted from said optically-addressable spatial light modulator.

10. A fingerprint identification apparatus for measuring correlation of an image of a fingerprint of a specific individual and an image of a fingerprint of an arbitrary individual to thereby determine whether or not the arbitrary individual is identified with the specific individual, the fingerprint identification apparatus comprising:

a light source for radiating light bearing an image of a fingerprint of a specific individual, an image of a fingerprint of an arbitrary individual to be identified with the specific individual, and a background image;

a mask member for receiving the light from said light source, said mask member having a mask area for blocking light bearing the background image while transmitting light bearing the fingerprints of the specific individual and the arbitrary individual;

a first optically-addressable spatial light modulator including an optically-addressing part for receiving the light bearing the fingerprints of the specific individual and the arbitrary individual and a modulation part having an optical characteristic, the optically-addressing part changing the optical characteristic of the modulation part dependently on the images of the fingerprints of the specific individual and the arbitrary individual, the modulation part receiving and modulating first read-light in accordance with the changed optical characteristic;

a first Fourier transform lens for receiving the first read-light modulated by and outputted from said first spatial light modulator and spatially Fourier transforming the first read-light to thereby allow the first read-light to form a Joint Fourier Transform image for the image of the fingerprint of the specific individual and the image of the fingerprint of the arbitrary individual;

a second optically-addressable spatial light modulator including an optically-addressing part for receiving the first read-light bearing the Joint Fourier Transform image and a modulation part having an optical characteristic, the optically-addressing part changing the optical characteristic of the modulation part dependently on the Joint Fourier Transform image, the modulation part receiving and modulating second read-light in accordance with the changed optical characteristic;

a second Fourier transform lens for receiving the second read-light modulated by and outputted from said second spatial light modulator and spatially Fourier transforming the second read-light to thereby allow the second read-light to form a pair of correlation peaks; and correlation detecting means for detecting the intensity of one of the pair of correlation peaks indicative of the correlation of the image of the fingerprint of the specific individual and the image of the fingerprint of the arbitrary individual which determines whether or not the arbitrary individual is identified as the specific individual;

wherein said mask member has a pair of apertures each for transmitting the light bearing at least a portion of the images of the fingerprints of the specific individual and the arbitrary individual, wherein the apertures have low correlation with one another; and wherein the mask area has light transmittance of a zero value for blocking the light from said light source, each of the apertures of said pair of apertures has high light transmittance, and each of the apertures of said pair of apertures has light transmittance lowering gradually from the center of the aperture to the edge of the aperture.

11. The fingerprint identification apparatus as claimed in claim 10, wherein the pair of apertures have different orientations with one another.

* * * * *